(12) United States Patent
Eilken et al.

(10) Patent No.: US 11,685,504 B2
(45) Date of Patent: Jun. 27, 2023

(54) SHELL ARRANGEMENT FOR A FUSELAGE OF AN AIRCRAFT AND FUSELAGE FOR AN AIRCRAFT

(71) Applicant: Airbus Operations GmbH, Hamburg (DE)

(72) Inventors: Wolfgang Eilken, Hamburg (DE); Wolfgang Schulze, Hamburg (DE); Christoph Schweim, Hamburg (DE); Patrick Brusberg, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 428 days.

(21) Appl. No.: 16/881,819

(22) Filed: May 22, 2020

(65) Prior Publication Data
US 2020/0369359 A1 Nov. 26, 2020

(30) Foreign Application Priority Data
May 24, 2019 (DE) .................... 10 2019 207 623.8

(51) Int. Cl.
*B64C 1/06* (2006.01)
*B29C 65/00* (2006.01)
(Continued)

(52) U.S. Cl.
CPC .......... *B64C 1/069* (2013.01); *B29C 66/1122* (2013.01); *B64C 1/12* (2013.01);
(Continued)

(58) Field of Classification Search
CPC .... B64C 1/069; B64C 1/12; B64C 2001/0045
See application file for complete search history.

(56) References Cited

U.S. PATENT DOCUMENTS 5,297,760 A * 3/1994 Hart-Smith ............... B64C 1/12
403/41
6,042,055 A * 3/2000 Messinger ............. B64C 3/185
244/131
(Continued)

FOREIGN PATENT DOCUMENTS

| DE | 10 2006 046 080 A1 | 4/2008 |
| DE | 10 2013 203 714 A1 | 9/2014 |
| DE | 10 2015 106 761 A1 | 11/2016 |

OTHER PUBLICATIONS

German Search Report for Application No. 102019207623.8 dated Nov. 15, 2019.
(Continued)

*Primary Examiner* — Philip J Bonzell
(74) *Attorney, Agent, or Firm* — KDW Firm PLLC

(57) ABSTRACT

A shell arrangement for a fuselage of an aircraft includes a first shell portion extending in a curved manner in a shell peripheral direction and a second shell portion extending in a curved manner in the shell peripheral direction, wherein, in an overlapping portion of the shell arrangement, a first end region of the first shell portion and a second end region of the second shell portion overlap each other in the shell peripheral direction and a first outer face of the first shell portion and a second inner face of the second shell portion are adhesively bonded to each other by an adhesive layer, and wherein an edge of the first shell portion which terminates the first end region with respect to the shell peripheral direction extends in the overlapping portion in an undulating manner in a shell longitudinal direction which extends transversely relative to the shell peripheral direction.

14 Claims, 3 Drawing Sheets

(51) Int. Cl.
  *B64C 1/12*   (2006.01)
  *B29L 31/30*  (2006.01)
  *B64C 1/00*   (2006.01)

(52) U.S. Cl.
  CPC .............. *B29L 2031/3082* (2013.01); *B64C 2001/0045* (2013.01)

(56) References Cited

U.S. PATENT DOCUMENTS

| | | | |
|---|---|---|---|
| 8,039,115 | B2 | 10/2011 | Hackius et al. |
| 8,752,293 | B2 * | 6/2014 | Jones .................... B29C 70/545 |
| | | | 156/196 |
| 9,126,670 | B2 * | 9/2015 | Thable ................... B64C 1/069 |
| 9,441,652 | B2 * | 9/2016 | Griess .................... B64C 1/069 |
| 9,469,084 | B2 * | 10/2016 | Beumler ................. B32B 15/08 |
| 9,764,499 | B2 * | 9/2017 | Jones ....................... B64F 5/10 |
| 2009/0134275 | A1 * | 5/2009 | Hackius ................... B64C 1/12 |
| | | | 244/117 R |
| 2009/0148647 | A1 * | 6/2009 | Jones ....................... B64F 5/10 |
| | | | 156/159 |
| 2013/0196121 | A1 * | 8/2013 | Beumler .................. B32B 5/26 |
| | | | 428/189 |
| 2014/0255088 | A1 | 9/2014 | Drazic |
| 2014/0356057 | A1 * | 12/2014 | Griess .................... B64C 1/069 |
| | | | 403/291 |
| 2016/0167762 | A1 * | 6/2016 | Jones ................... B29C 70/304 |
| | | | 428/58 |
| 2016/0318595 | A1 | 11/2016 | Orlov |

OTHER PUBLICATIONS

German Office Action for Application No. 102019207623.8 dated Jan. 28, 2020.

* cited by examiner

SHELL ARRANGEMENT FOR A FUSELAGE OF AN AIRCRAFT AND FUSELAGE FOR AN AIRCRAFT

CROSS-REFERENCE TO RELATED APPLICATION

This application claims priority to DE 10 2019 207 623.8 filed May 24, 2019, the entire disclosure of which is incorporated by reference herein.

TECHNICAL FIELD

The disclosure herein relates to a shell arrangement for a fuselage of an aircraft, a fuselage, in particular a pressure fuselage for an aircraft and a shell component for a shell arrangement.

BACKGROUND

A fuselage of an aircraft typically has a frame structure with a large number of ribs and longitudinal members and an outer skin which is secured to the frame structure. The outer skin is generally formed by a large number of skin panels or shell components which are curved in a peripheral direction of the fuselage and which are secured to the ribs. Generally, in this instance, the edge regions are arranged so as to overlap by two adjacent shell portions with respect to the peripheral direction and riveted to each other.

DE 10 2013 203 714 A1 describes a bodywork component for a motor vehicle which has an inner portion and an outer portion, wherein the inner portion and the outer portion are adhesively bonded and the outer portion is folded with an edge-side overhang over the edge region of the inner portion. In order to prevent adhesive from escaping, the edge region of the inner portion is formed with cutouts which are intended to receive the adhesive.

SUMMARY

An object of the disclosure herein is to provide solutions for connecting, in particular adhesively bonding, shell components of a fuselage of an aircraft, which are improved with regard to the mechanical durability.

This object is achieved in each case by the aspects of subject-matter of herein.

Advantageous embodiments and developments will be appreciated from the description herein.

According to a first aspect of the disclosure herein, a shell arrangement for a fuselage of an aircraft having a first shell portion which extends in a curved manner in a shell peripheral direction and a second shell portion which extends in a curved manner in the shell peripheral direction is provided. In an overlapping portion of the shell arrangement, a first end region of the first shell portion and a second end region of the second shell portion are arranged so as to overlap each other in the shell peripheral direction and a first outer face of the first shell portion and a second inner face of the second shell portion are adhesively bonded to each other by an adhesive layer. An edge of the first shell portion which terminates the first end region with respect to the shell peripheral direction extends in the overlapping portion in an undulating manner in a shell longitudinal direction which extends transversely relative to the shell peripheral direction.

The first and the second shell portions may, for example, be produced as rectangular plates or panels which extend in a planar manner in a shell peripheral direction and in a shell longitudinal direction and which are curved in the shell peripheral direction. The first shell portion may, for example, have a concave-curved first inner face and a convex-curved first outer face which is oriented in the opposite direction thereto. Accordingly, the second shell portion may have a concave-curved second inner face and a convex-curved second outer face which is oriented in the opposite direction thereto. The first and the second shell portions overlap each other with respect to the peripheral direction with the end regions thereof, wherein the outer face of one shell portion is adhesively bonded to the inner face of the other shell portion in the overlapping portion. An adhesive connection which extends in the peripheral direction and in the longitudinal direction is thereby formed between the shell portions.

According to the disclosure herein, the first shell portion has a border which extends in an undulating manner or an edge which extends in an undulating manner. The edge or the border defines a first end of the first shell portion with respect to the peripheral direction and at the same time an end of the overlapping portion. The edge is consequently constructed in a crimped or undulating manner in the shell longitudinal direction. Consequently, the edge has in the overlapping portion a spatial extent which can be described by a wave function, wherein an abscissa extends in the shell longitudinal direction and an ordinate extends in the shell peripheral direction. In other words, the edge forms in the shell longitudinal direction regions which repeat periodically and which protrude and recede in the shell peripheral direction. An edge of a contact face between the outer face of the first shell portion and the adhesive layer is thereby formed and has portions which extend non-perpendicularly to the shell peripheral direction.

The disclosure herein is based on the notion of improving the mechanical strength of the adhesive connection between the first and the second shell portions or skin panel by reducing peeling stress peaks in peripheral edge regions of the adhesive layer by at least one of the shell portions being formed with an edge extending in an undulating manner. As a result of the pressure difference which is formed in a pressure fuselage of an aircraft at flight altitude between an inner space of the pressure fuselage and the environment, there is produced an introduction of force into the outer skin formed by the shell arrangement. As a result of the undulating path of the edge of the first shell portion, the edge of a contact face between the surface of the shell portion having the undulating edge and the adhesive layer is also undulating and consequently has portions which extend at least partially in a non-perpendicular manner with respect to the peripheral direction. In the event of an introduction of force into the shell portions in the peripheral direction, in the portions which extend in a non-perpendicular manner with respect to the peripheral direction, and consequently at the edge of the adhesive layer, the peeling stress which occurs is considerably reduced, whereby the mechanical durability and the fatigue strength of the adhesive connection is improved.

According to an embodiment of the shell arrangement, there is provision for the second shell portion to have in the second end region an inclination which is defined by a second outer face which is oriented in an opposite direction to the second inner face and which reduces a thickness of the second shell portion in the shell peripheral direction to form an edge which terminates the second end region with respect to the shell peripheral direction. The edge of the second shell portion forms a second edge or a second end of the overlapping portion. The edge region of the second shell portion is thus provided in the overlapping portion with a chamfer on the outer face so that the second shell portion tapers in the direction towards the edge. This affords the advantage that, as a result of the decreasing material thickness in the direction towards the edge, the rigidity of the second shell portion decreases, whereby the introduction of stress into the adhesive layer in the direction towards the second end of the overlapping portion decreases and the introduction of force is carried out more in a central region of the adhesive layer with respect to the shell peripheral direction. Unfavorable loads of the adhesive layer in the edge region are thereby reduced.

The second shell portion optionally forms a portion of the shell arrangement which is external with respect to a radial direction which extends transversely to the shell longitudinal direction and the shell peripheral direction. Accordingly, the end region of the second shell portion which overlaps with the end region of the first shell portion is provided to form an outer face and consequently a flow surface of the fuselage of the aircraft. In this instance, the shaping with an inclination is aerodynamically advantageous since it forms a transition between the first and the second shell portion which is only slightly stepped. In addition to the aerodynamic advantage, as a result of the inclination a jump in rigidity in the shell arrangement at the side of the outer faces is reduced, whereby stresses in the adhesive layer can be further reduced.

According to another embodiment, there is provision for the inclination to have an inclination length in the shell peripheral direction and an inclination height which is defined by a change of the thickness, wherein a relationship between the inclination length and the inclination height is between 20:1 and 40:1. This relationship defines the pitch of the inclination in the peripheral direction. In the stated region, it has been found that the introduction of stress into the adhesive layer is reduced in a particularly efficient manner.

According to another embodiment, the inclination length is in a range between 20 percent and 60 percent, in particular between 40 percent and 50 percent, of an overlapping depth which the overlapping portion has in the shell peripheral direction. The inclination consequently has an extent in the peripheral direction which is at a predetermined ratio with respect to the extent of the overlapping portion in the peripheral direction. The extent of the overlapping portion is defined by the spacing of the edge of the second shell portion with respect to the edge of the first shell portion in the peripheral direction. In particular, the inclination length may be less than or equal to 50 percent and greater than 20 percent of the overlapping depth. The majority of the force originating from the second shell portion is thereby introduced with respect to the peripheral direction centrally into the adhesive layer. Consequently, unfavourable loads of the adhesive layer in the edge region are further reduced.

According to another embodiment, there is provision for an edge of the second shell component which terminates the second end region with respect to the shell peripheral direction to extend in the overlapping portion in an undulating manner in the shell longitudinal direction. As has already been extensively explained for the first shell component, the edge of the second shell component may also be constructed to extend in an undulating manner, whereby unfavourable loads of the adhesive layer in the edge region can be further reduced and consequently the durability of the adhesive connection is further improved.

According to another embodiment of the shell arrangement, the edge of the first shell portion forms in the overlapping portion at least one wave having a wavelength in the shell longitudinal direction and an amplitude in the shell peripheral direction.

According to another embodiment, there is provision for the edge of the first shell portion to extend in the form of a sine wave, in the form of waves which are composed of semi-circles or in the form of a triangular wave. Consequently, the protruding and receding regions of the edge formed by the undulating path may extend in a curved or zig-zag manner. Waves which extend in a triangular manner are intended to be understood to be also, for example, saw-tooth-like waves.

According to a second aspect of the disclosure herein, a shell portion for a shell arrangement according to the first aspect of the disclosure herein is provided, wherein the shell portion extends in a curved manner in a shell peripheral direction and a first edge of the shell portion which terminates the shell portion with respect to the shell peripheral direction extends at least partially in an undulating manner in a shell longitudinal direction which extends transversely relative to the shell peripheral direction. The features and advantages disclosed with respect to the shell arrangement according to the first aspect of the disclosure herein also apply in a similar manner to the shell portion according to this aspect of the disclosure herein, and vice versa.

According to an embodiment of the shell portion, there is provision for the shell portion to have in a second end region located opposite the first edge an inclination which is defined by a convex-curved outer face of the shell portion and which reduces a thickness of the shell portion in the shell peripheral direction to form a second edge which terminates the second end region with respect to the shell peripheral direction. Accordingly, the shell portion is constructed with respect to the peripheral direction in a first end region with a crimped or undulating edge and in a second end region located opposite thereto with an inclination which reduces the thickness of the shell component. Consequently, an outer skin of a fuselage for an aircraft can be constructed in a particularly simple manner by overlapping arrangement of the first end region of a first shell component with a second end region of another shell component.

According to a third aspect of the disclosure herein, a fuselage for an aircraft is provided. The fuselage comprises a large number of rib frames which are arranged spaced apart from each other along a fuselage longitudinal axis and which surround it in a fuselage peripheral direction, a large number of longitudinal carriers which extend along the fuselage longitudinal axis and which are connected to the rib frames, and a shell arrangement according to the first aspect of the disclosure herein. The shell portions of the shell arrangement are connected to at least one rib frame and extend in the shell longitudinal direction along the fuselage longitudinal axis and in the shell peripheral direction in the fuselage peripheral direction.

The pressure fuselage consequently comprises a frame structure which is formed by preferably circular rib frames which are arranged parallel with each other and by longitudinal carriers or stringers which connect the rib frames. The shell arrangement at least partially forms an outer skin of the fuselage.

The features and advantages which are disclosed with respect to the shell arrangement according to the first aspect of the disclosure herein or the shell portion according to the second aspect of the disclosure herein also apply similarly to the pressure fuselage according to this aspect of the disclosure herein, and vice versa.

With respect to directional indications and axes, in particular directional indications and axes which relate to the path of physical structures, a path of an axis, a direction or a structure "in/along" another axis, direction or structure is intended to be understood herein to mean that they, in particular the tangents which are produced at a respective location of the structures, extend in each case at an angle less than or equal to 45 degrees, preferably less than 30 degrees and particularly preferably parallel with each other.

With respect to directional indications and axes, in particular directional indications and axes which relate to the path of physical structures, a path of an axis, a direction or a structure "transverse" relative to another axis, direction or structure is intended to be understood herein to mean that they, in particular the tangents which are produced at a respective location of the structures, extend in each case at an angle greater than or equal to 45 degrees, preferably greater than or equal to 60 degrees and particularly preferably perpendicularly to each other.

BRIEF DESCRIPTION OF THE DRAWINGS

The disclosure herein is explained below with reference to the Figures of the drawings, in which.

In the Figures, the same reference numerals refer to identical or functionally identical components, unless stated otherwise.

DETAILED DESCRIPTION

Figure 1:
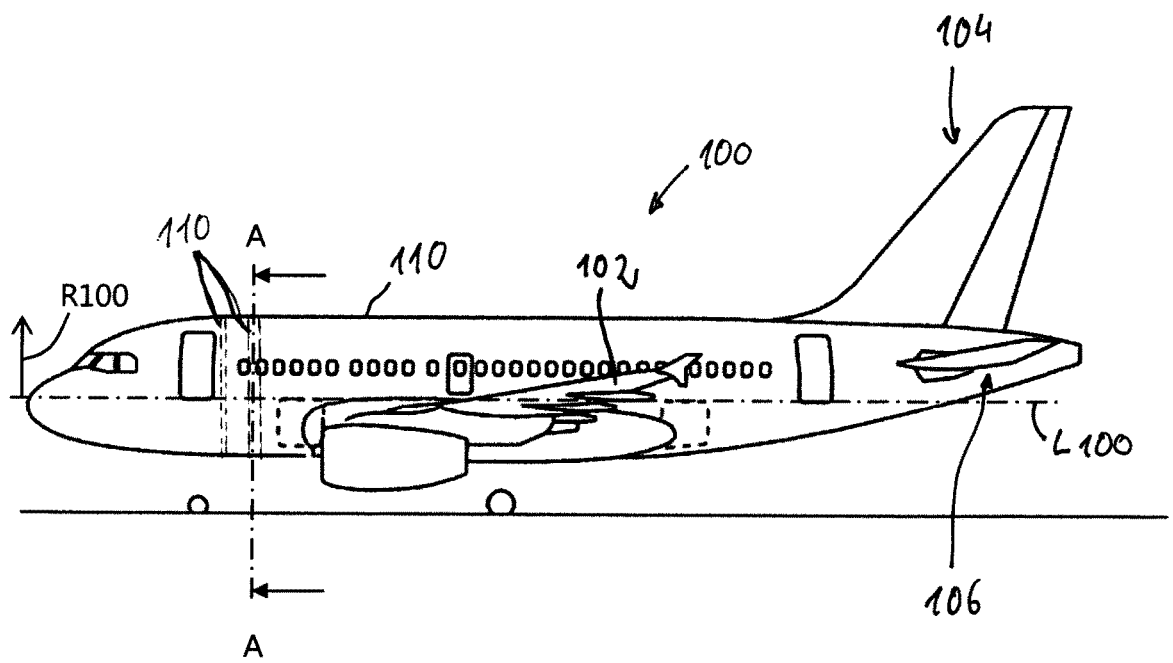
FIG. 1 is a schematic side view of an aircraft with a fuselage according to an embodiment of the disclosure herein.

FIG. 1 shows an aircraft 100 by way of example. The aircraft 100 has a fuselage 110 which defines a fuselage longitudinal axis L100. The aircraft 100 further has wings 102 which protrude laterally from the fuselage 110 and which are connected thereto, a side tail unit 104 and a vertical tail unit 106, wherein the side tail unit 104 and the vertical tail unit 106 are each arranged in an end region of the fuselage 110 and are connected thereto.

Figures 2, 3:
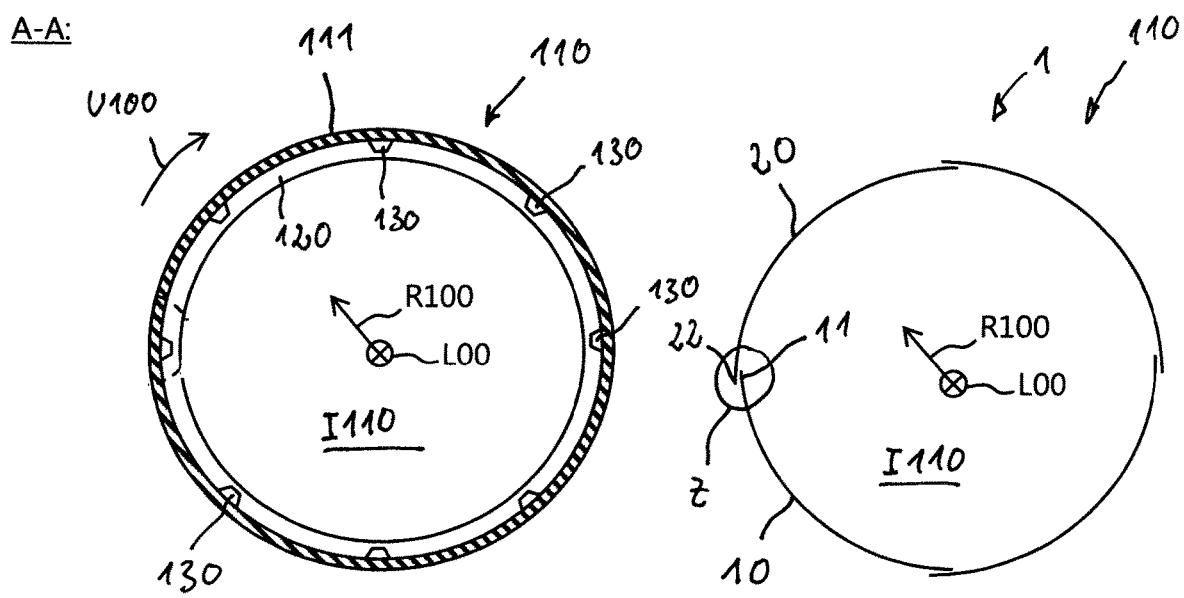
FIG. 2 is a schematic sectioned view of the aircraft shown in FIG. 1, which is produced with a section along the line A-A shown in FIG. 1.
FIG. 3 is a further simplified illustration of the sectioned view illustrated in FIG. 2, wherein only a shell arrangement which forms an outer skin of the fuselage is illustrated.

FIG. 2 is a schematic sectioned view of the fuselage 110 along the line A-A marked in FIG. 1. The fuselage 110 has a large number of rib frames 120, a large number of longitudinal carriers 130 and an outer skin 111. The outer skin 111 has a shell arrangement 1 which will be described in detail below or is formed thereby.

As schematically illustrated in FIG. 2, the rib frames 120 may, for example, be produced as circular closed frame carriers, which extend in a fuselage peripheral direction U100 and which surround the fuselage longitudinal axis L100. The rib frames 120 may in particular be produced as profile carriers which, for example, have a Z-shaped cross-section. As illustrated schematically in FIGS. 1 and 6, the rib frames 120 are arranged with spacing along the fuselage longitudinal axis L100, in particular parallel with each other. The rib frames 120 may be composed of several components, for example, by a plurality of circle segments. The rib frames 120 may in particular be formed from a metal material, for example, titanium, a titanium alloy or aluminium or an aluminium alloy, or a fiber composite material, such as, for example, a carbon-fiber-reinforced plastics material.

The longitudinal carriers 130 may in particular be produced as linearly extending profile carriers, for example, with an Ω-shaped cross-sectional profile, as illustrated schematically in FIG. 2 by way of example. The longitudinal carriers 130 extend along the fuselage longitudinal axis L100, are arranged in the fuselage peripheral direction U100 with spacing from each other and may in particular extend parallel with each other. The longitudinal carriers 130 are connected to the rib frames 120, for example, welded, riveted or adhesively bonded thereto. The longitudinal carriers 130 may in particular be formed from a metal material, for example, titanium, a titanium alloy or aluminium or an aluminium alloy, or a fiber composite material, such as, for example, a carbon-fiber-reinforced plastics material.

The rib frames 120 and the longitudinal carriers 130 form a fuselage frame which defines a fuselage inner space I110. With respect to a radial direction R100 which extends transversely relative to the fuselage longitudinal axis L100, there is fitted externally to the fuselage frame an outer skin 111 which terminates the fuselage inner space I100 with respect to the radial direction R100. As schematically illustrated in FIG. 3, the outer skin 111 may be formed by a shell arrangement 1 having a plurality of shell portions 10, 20 which overlap in the edge regions or end regions 11, 22 thereof and which are connected to each other, in particular adhesively bonded to each other. Each of the shell portions 10, 20 is connected to at least one rib frame 120, for example, riveted, screwed thereto or secured thereto in a similar manner. Optionally, the shell portion 10, 20 may also additionally be secured to the longitudinal carriers 130.

The fuselage inner space I110 may, for example, be used as a freight compartment or as a passenger cabin, generally as a pressure fuselage of the aircraft 100. The fuselage inner space I110 is in particular sealed in a pressure-tight manner with respect to the environment. During a flight of the aircraft 100, as the flight altitude increases a pressure difference occurs between the fuselage inner space I110 and the environment as a result of the falling ambient pressure. As a result of the overpressure applied in the fuselage inner space I110, mechanical loads are introduced into the fuselage frame and via this into the shell arrangement 1 or the outer skin 111. As a result of the substantially circular periphery of the fuselage 110, tangential stresses which act in the peripheral direction occur in the outer skin 111. As a result of the curvature of the shell portions 10, 20, this leads in the overlapping region of the shell portions 10, 20 to a peeling stress, which acts on the adhesive connection.

Figure 4:
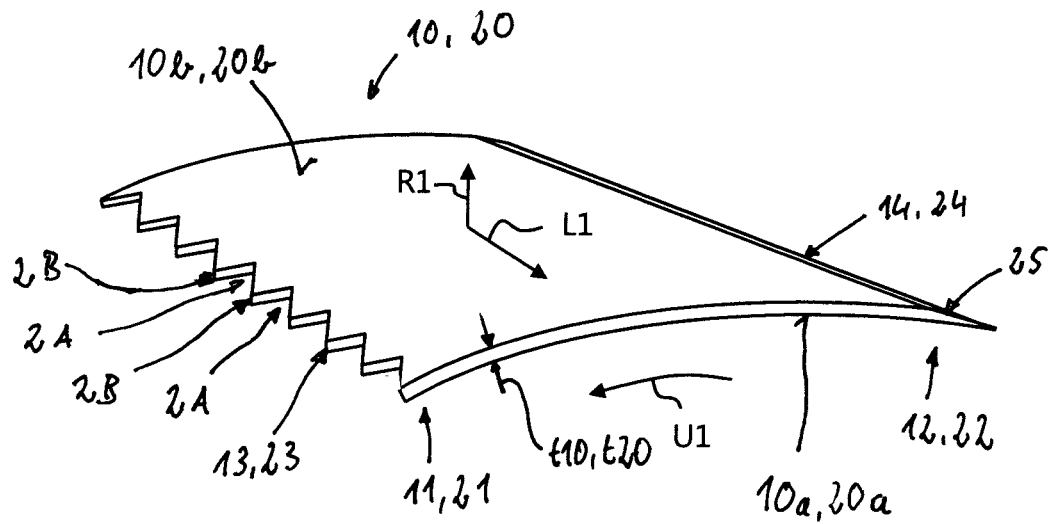
FIG. 4 is a perspective view of a shell component according to an embodiment of the disclosure herein.

FIG. 4 shows by way of example a shell portion 10, 20 for a shell arrangement 1 for the above-described fuselage 110 of the aircraft. FIGS. 5 to 8 show by way of example a shell arrangement 1 having such shell portions 10, 20. As illustrated schematically in FIG. 4, the shell portion 10, 20 is produced as a panel extending in a planar manner. The shell portion 10, 20 has an inner face 10a, 20a which is curved in a concave manner in a shell peripheral direction U1 and an outer face 10b, 20b which is oriented in the opposite direction thereto and which is curved in a convex manner in the shell peripheral direction U1. The inner face 10a, 20a and the outer face 10b, 20b extend further in a shell longitudinal direction L1, which extends transversely relative to the shell peripheral direction U1. The inner face 10a, 20a and the outer face 10b, 20b define a thickness t10, t20 of the shell portion 10, 20 with respect to a radial direction R1 which extends transversely relative to the shell peripheral direction U1 and transversely relative to the shell longitudinal direction L1. The shell portion 10, 20 may in particular be produced from a metal sheet, for example, an aluminum sheet. It is also conceivable for the shell portion 10, 20 to be formed from a fiber composite material, in particular a carbon-fiber-reinforced plastics material.

As can be seen in FIG. 4, the shell portion 10, 20 extends with respect to the shell peripheral direction U1 between a first edge 13, 23 or first longitudinal edge 13, 23 and a second edge 14, 24 or second longitudinal edge 14, 24 located opposite it. The first edge 13, 23 is adjoined with respect to the shell peripheral direction U1 by a first end region 11, 21 of the shell portion 10. The second edge 14, 24 is adjoined with respect to the shell peripheral direction U1 by a second end region 12, 22 of the shell portion 10.

As illustrated schematically and by way of example in FIG. 4, the first longitudinal edge 13, 23 of the shell portion 10, 20 has a large number of indentations 2A and projections 2B which are successive in an alternating manner in the shell longitudinal direction L1. The indentations 2A and projections 2B are constructed in the shell longitudinal direction L1 with a periodically repeating shape. In FIG. 4, these indentations 2A and projections 2B are illustrated purely by way of example as triangular indentations 2A and projections 2B. They may also in each case be formed in the manner of a circle, sine wave or generally in an alternating manner as concave indentations 2A and convex projections 2B. In the shell longitudinal direction L1, the first edge 13, 23 consequently protrudes alternately in the shell peripheral direction U1 and recedes in the shell peripheral direction U1. Generally, the first edge 13, 23 consequently extends in an undulating manner in the shell longitudinal direction L1, as can be seen in particular in a plan view of the inner face 10a, 20a or the outer face 10b, 20b of the shell portion 10, 20. FIG. 4 shows by way of example that the entire first edge 13, 23 extends in a crimped or undulating manner. However, it is also conceivable for only one or more longitudinal portions of the first edge 13, 23 to extend in an undulating manner. For example, there may be provision for the edge 13, 23 of the shell portion 10, 20 to form at least one wave having a wavelength w1 in the shell longitudinal direction L1 and an amplitude a1 in the shell peripheral direction U1.

As further illustrated in FIG. 4, the shell portion 10, 20 may have an optional inclination 25 which is constructed in the second end region 12, 22 of the shell portion 10, 20. The inclination 25 is formed on the outer face 10b, 20b of the shell portion 10, 20 or defined thereby. The inclination 25 extends in the shell peripheral direction U1 as far as the second edge 14, 24 in such a manner that the thickness t10, t20 of the shell portion 10, 20 decreases in the direction towards the second edge 14, 24. In the inclination 25, the outer face 10b, 20b of the shell portion 10, 20 may, for example, be planar or even.

Figure 5:
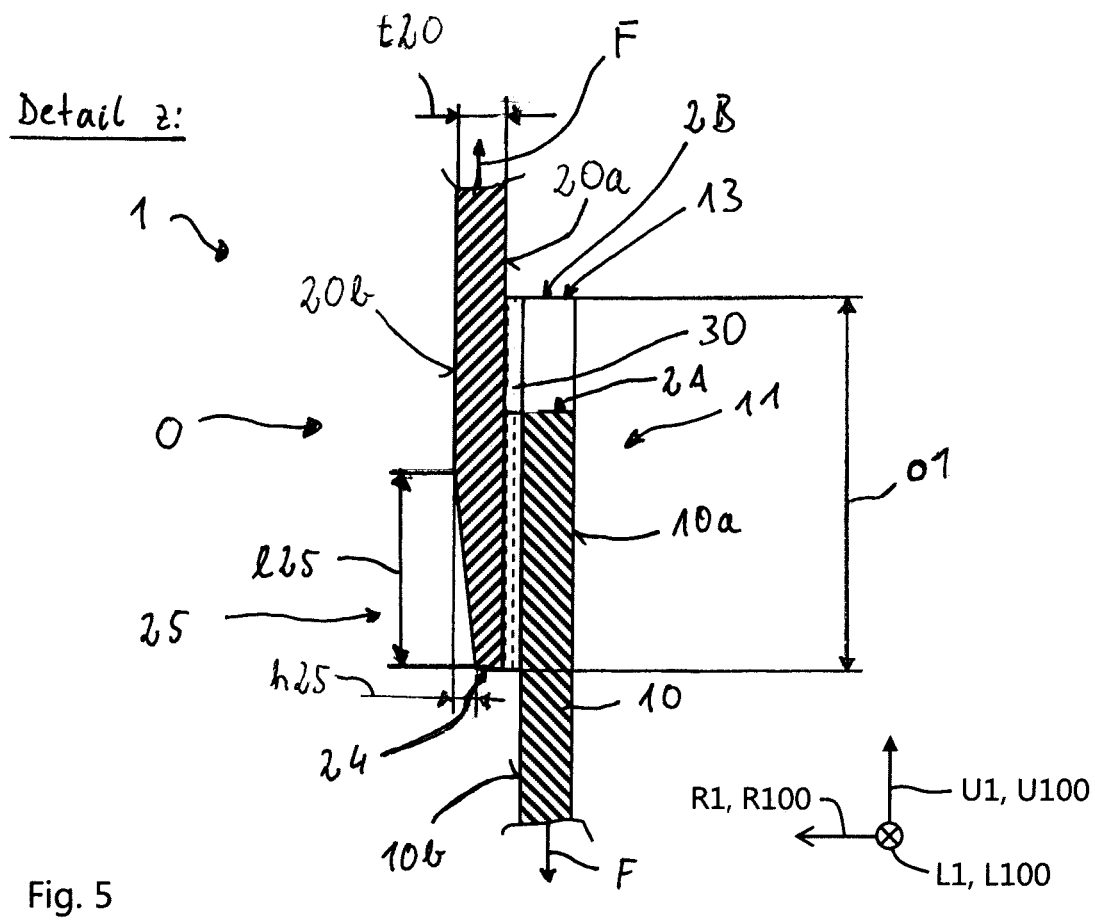
FIG. 5 is a detailed view of the region designated Z of the shell arrangement illustrated in FIG. 3.

FIGS. 5 to 8 show in each case a shell arrangement 1 having a first shell portion 10 and a second shell portion 20. The shell portions 10, 20 may, for example, be formed as described above. FIG. 5 shows a detailed view of an overlapping region O of the shell arrangement 1. In the overlapping portion O, the first end region 11 of the first shell portion 10 and the second end region 22 of the second shell portion 20 are arranged so as to overlap each other in the shell peripheral direction U1. In particular, the inner face 20a of the second shall portion 20, also referred to below as the second inner face 20a, overlaps the outer face 10b of the first shell portion 10 which is also referred to below as the first outer face 10b. As schematically illustrated in FIG. 5, the first outer face 10b and the second inner face 20a are adhesively bonded to each other in the overlapping region O by an adhesive layer 30. As can be seen in FIG. 5, the first and the second shell portions 10, 20 overlap in the overlapping region O with a predetermined overlapping depth o1. The overlapping depth o1 may in particular be defined as a spacing in the shell peripheral direction U1 between the second edge 24 of the second shell portion 20 and the first edge 13 of the first shell portion 10, wherein the spacing at the first edge 13 of the first shell portion 10 is measured at a projection 2B of the edge 13. The overlapping depth o1 may be in a range between 40 mm and 80 mm. As can be seen in FIG. 5, the adhesive layer 30 terminates in each case at the first edge 13 of the first component 10 and at the second edge 24 of the second component 20. Consequently, the adhesive layer 30 is also constructed with an undulating edge.

In the shell arrangement 1 illustrated by way of example in FIG. 5, the first edge 13 of the first shell portion 10 extends in the overlapping portion O in an undulating manner and the second end region 22 of the second shell portion 20 is, as described above, constructed with an inclination 25. The inclination 25 may in particular have an inclination length l25 in the shell peripheral direction U1 and an inclination height h25 which is defined by a change of the thickness t20 of the second shell portion 20. A relationship between the inclination length l25 and inclination height h25 may, for example, be in the range between 20:1 and 40:1. Regardless of this relationship between the inclination length l25 and inclination height h25, the inclination length l25 may be between 20 percent and 60 percent, in particular between 40 percent and 50 percent of the overlapping depth o1.

Alternatively or additionally to the embodiment of the second end region 22 of the second shell component with an inclination 25 as illustrated in FIG. 5 by way of example, the second edge 24 of the second shell portion 20 may extend in the overlapping region O in the shell longitudinal direction L1 in an undulating manner, as already explained for the first edge 13 of the first shell portion 10.

Figure 6:
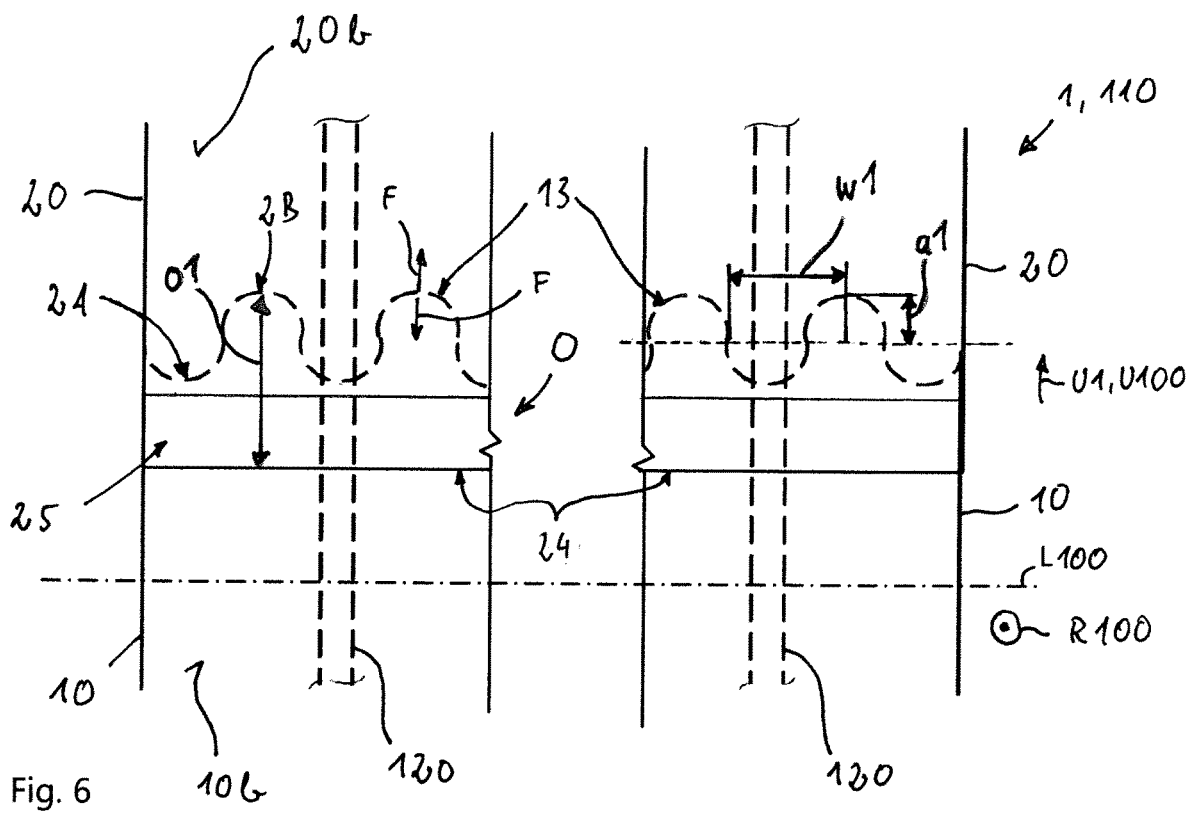
FIG. 6 is a plan view of a shell arrangement in a fuselage according to an embodiment of the disclosure herein.

FIG. 6 shows a part-view of the fuselage 110 with the shell arrangement 1 as a plan view of the outer faces 10b, 20b of the shell portions 10, 20. As can be seen in FIG. 6, the shell portions 10, 20 extend in the shell longitudinal direction L1 along the fuselage longitudinal axis L100 between the rib frames 120 and in the shell peripheral direction U1 in the fuselage peripheral direction U100. In the fuselage 110 illustrated in FIG. 6 by way of example, the second shell portion 20 is located externally with respect to the radial direction R1, R100 in the overlapping region O. The inclination 25 affords the advantage that an aerodynamically advantageous transition between the first and the second shell portion 10, 20 is formed. In FIG. 6, by way of example, an undulating path of the first edge 13 of the first shell portion 10 is illustrated, in which the first edge 13 extends in the form of waves composed of semi-circles. The edge 13 accordingly has in the shell longitudinal direction L1 successively alternating concave indentations or recesses 2A and convex projections 2B. As can be seen in FIG. 6, the first edge 13 may form in the overlapping region O a plurality of waves or generally at least one wave with a wavelength w1 and an amplitude a1.

Figures 7, 8:
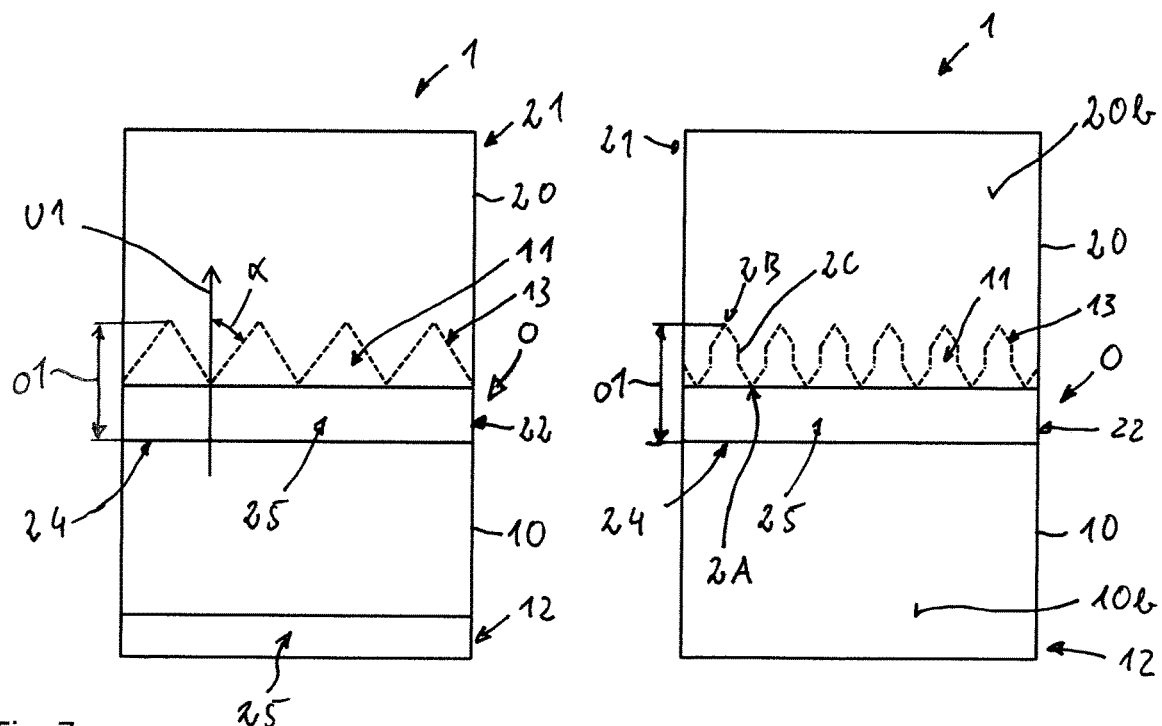
FIG. 7 is a plan view of a shell arrangement according to another embodiment of the disclosure herein.
FIG. 8 is a plan view of a shell arrangement according to another embodiment of the disclosure herein.

FIG. 7 shows by way of example another shell arrangement 1 in which the first shell portion 10 is constructed as illustrated in FIG. 4 and the second shell portion 20 in the second end region 22 is constructed with an inclination 25. In the first end region 21 or on the first edge 23, the second shell portion 20 does not, however, have an undulating path. The first edge 13 of the first shell portion 13 extends in a triangular or saw-tooth-like manner.

FIG. 8 shows another shell arrangement 1 in which the second shell portion 20 is constructed with an inclination 25 in the second edge region 22, but, on the second edge 23, the second shell portion 20 does not have an undulating path. The first shell portion 10 does not have an inclination 25 at the second end region 12. The first edge 13 of the first shell portion 13 extends in a triangular manner, wherein the indentations 2A and the projections 2B are constructed in each case by triangular portions which are connected by connection portions 2C which extend in the shell peripheral direction U1.

FIG. 5 schematically illustrates the forces F acting on the shell arrangement 1 in the event of a pressure difference between the fuselage interior I110 and the environment. As can be seen in FIG. 5, these forces F act in the shell peripheral direction U1. Since the forces F as a result of the overlapping arrangement of the shell portions 10, 20 act with radial spacing from the adhesive layer 30 and consequently eccentrically with respect to the neutral fiber, there is produced a secondary bending and therefore peeling loading of the adhesive layer 30, in particular in the end regions of the adhesive layer 30 with respect to the shell peripheral direction U1. As a result of the undulating path of the first edge 13 of the first shell portion 10, the first edge 13 and consequently a contact face or a contact line between the adhesive layer 30 and the first outer face 10b extends at least partially obliquely with respect to the shell peripheral direction U1. For example, as a result of the undulating path, there are formed portions of the edge 13 which extend at an angle α relative to the shell peripheral direction U1 which is not equal to 90 degrees, as illustrated schematically in FIG. 8. In these regions, the force which results from the secondary bending and which is introduced into the adhesive layer 30 is reduced. The force is thereby instead introduced into the central region of the adhesive layer 30 with respect to the shell peripheral direction U1 and the peel stresses in the end regions are thereby reduced. This effect can be further amplified by the inclination 25 since, as a result of the reduction of the thickness t20 in the direction towards the edge 24, the force introduced in the end region of the adhesive layer 30 is reduced.

Although the disclosure herein has been explained above by way of example with reference to embodiments, it is not limited thereto, but can instead be modified in various manners. In particular, combinations of the above embodiments are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

1 Shell arrangement
2A Indentations
2B Projections
10 First shell portion
10b First outer face of the first shell portion
11 First end region of the first shell portion
12 Second end region of the first shell portion
13 First edge of the first shell portion
14 Second edge of the first shell portion
20 Second shell portion
20a Second inner face of the second shell portion
20b Second outer face of the second shell portion
21 First end region of the second shell portion
22 Second end region of the second shell portion
23 First edge of the second shell portion
24 Second edge of the second shell portion
25 Inclination
30 Adhesive layer
100 Aircraft
102 Wing
104 Side tail unit
106 Vertical tail unit
110 Fuselage
111 Outer skin
120 Rib frame
130 Longitudinal carrier
a1 Amplitude
h25 Inclination height
I110 Fuselage interior
L1 Shell longitudinal direction
L100 Fuselage longitudinal axis
l25 Inclination length
O Overlapping portion
o1 Overlapping depth
t20 Thickness of the second shell portion
U1 Shell peripheral direction
U100 Fuselage peripheral direction
w1 Wavelength
α Angle

The invention claimed is:

1. A shell arrangement for a fuselage of an aircraft, the shell arrangement comprising:
   a first shell portion, which extends in a curved manner in a shell peripheral direction; and
   a second shell portion, which extends in a curved manner in the shell peripheral direction;
   wherein, in an overlapping portion of the shell arrangement, a first end region of the first shell portion and a second end region of the second shell portion overlap each other in the shell peripheral direction;
   wherein, in the overlapping portion of the shell arrangement, a first outer face of the first shell portion and a second inner face of the second shell portion are adhesively bonded to each other by an adhesive layer;
   wherein an edge of the first shell portion, at which the first end region is terminated with respect to the shell peripheral direction, extends in the overlapping portion in an undulating manner in a shell longitudinal direction, the shell longitudinal direction being oriented to extend transversely relative to the shell peripheral direction;

wherein the second shell portion has, in the second end region, an inclination that is defined by a second outer face of the second shell portion, the second outer face of the second shell portion being oriented in an opposite direction to the second inner face and shaped so as to reduce a thickness of the second shell portion in the shell peripheral direction to form an edge that terminates the second end region with respect to the shell peripheral direction; and wherein the inclination has an inclination length that is defined in the shell peripheral direction, the inclination length being in a range between 20 percent and 60 percent of an overlapping depth, the overlapping depth being defined in the shell peripheral direction.

2. The shell arrangement according to claim 1, wherein:
the inclination has an inclination length that is defined in the shell peripheral direction, and an inclination height, which is defined by a change of the thickness; and
a relationship between the inclination length and the inclination height is between 20:1 and 40:1.

3. The shell arrangement according to claim 1, wherein an edge of the second shell portion, which terminates the first end region of the second shell component with respect to the shell peripheral direction, extends in the overlapping portion in an undulating manner in the shell longitudinal direction.

4. The shell arrangement according to claim 1, wherein the edge of the first shell portion forms at least one wave in the overlapping portion, the at least one wave having a wavelength in the shell longitudinal direction and an amplitude in the shell peripheral direction.

5. The shell arrangement according to claim 1, wherein the edge of the first shell portion extends in a form of a sine wave, in a form of waves which are composed of semi-circles, or in a form of a triangular wave.

6. The shell arrangement according to claim 1, wherein the inclination has an inclination length, as defined in the shell peripheral direction, the inclination length being in a range between 40 percent and 50 percent of an overlapping depth, the overlapping depth being defined in the shell peripheral direction.

7. The shell arrangement according to claim 1, wherein the inclination is defined by a convex-curved outer face of the second shell portion.

8. A fuselage for an aircraft, the fuselage comprising:
a plurality of rib frames arranged spaced apart from each other along a fuselage longitudinal axis, the plurality of rib frames being arranged so as to surround the fuselage longitudinal axis in a fuselage peripheral direction;
a plurality of longitudinal carriers, which extend along the fuselage longitudinal axis and are connected, respectively, to the rib frames; and
a shell arrangement according to claim 1;
wherein the first and second shell portions of the shell arrangement are connected to at least one of the plurality of rib frames and extend, in the shell longitudinal direction, along the fuselage longitudinal axis and, in the shell peripheral direction, in the fuselage peripheral direction.

9. The fuselage according to claim 8, wherein:
the inclination has an inclination length, as defined in the shell peripheral direction, and an inclination height, which is defined by a change of the thickness; and
a relationship between the inclination length and the inclination height is between 20:1 and 40:1.

10. The fuselage according to claim 8, wherein the inclination has an inclination length that is defined in the shell peripheral direction, the inclination length being in a range between 40 percent and 50 percent of an overlapping depth, the overlapping depth being defined in the shell peripheral direction.

11. The fuselage according to claim 8, wherein an edge of the second shell portion, which terminates the first end region of the second shell component with respect to the shell peripheral direction, extends in the overlapping portion in an undulating manner in the shell longitudinal direction.

12. The fuselage according to claim 8, wherein the edge of the first shell portion forms at least one wave in the overlapping portion, the at least one wave having a wavelength in the shell longitudinal direction and an amplitude in the shell peripheral direction.

13. The fuselage according to claim 8, wherein the edge of the first shell portion extends in a form of a sine wave, in a form of waves which are composed of semi-circles, or in a form of a triangular wave.

14. The fuselage according to claim 8, wherein the inclination is defined by a convex-curved outer face of the second shell portion.

* * * * *